CYRUS SMITH.
Improvement in Lubricating Car Wheels.

No. 120,337. Patented Oct. 24, 1871.

Witnesses:
A. Bennewendorf.
Francis McArdle.

Inventor:
Cyrus Smith
Per Munn & Co
Attorneys.

UNITED STATES PATENT OFFICE.

CYRUS SMITH, OF IRWIN'S STATION, PENNSYLVANIA.

IMPROVEMENT IN LUBRICATING CAR-WHEELS.

Specification forming part of Letters Patent No. 120,337, dated October 24, 1871.

*To all whom it may concern:*

Be it known that I, CYRUS SMITH, of Irwin's Station, in the county of Westmoreland and State of Pennsylvania, have invented a new and useful Improvement in Wheels for Cars and other Vehicles; and I do hereby declare that the following is a full, clear, and exact description thereof, which will enable others skilled in the art to make and use the same, reference being had to the accompanying drawing forming a part of this specification.

This invention relates to improvements for lubricating the axles of coal-cars and all other vehicles whose wheels turn loose on their axles, and has for its object to provide for a proper lubrication of the hubs and retention of the oil, and to prevent dust and dirt from entering the hub and wearing the axle.

Figure 1:
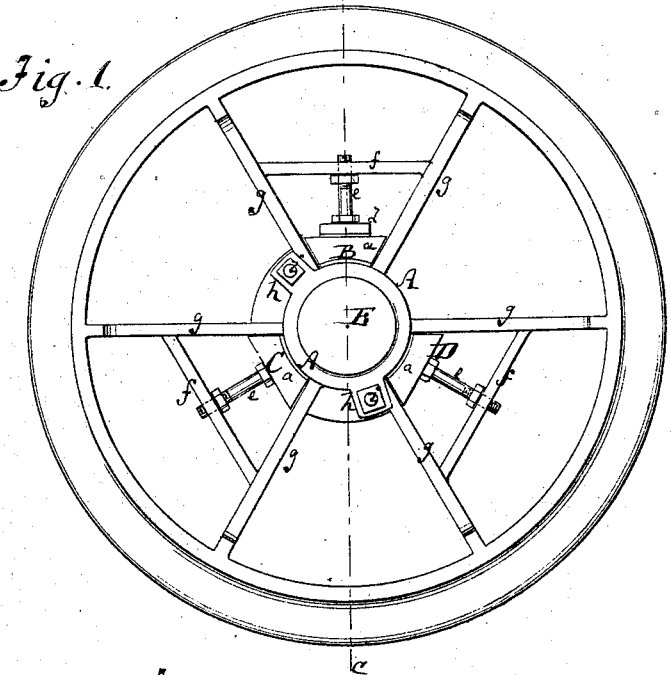
Figure 2:
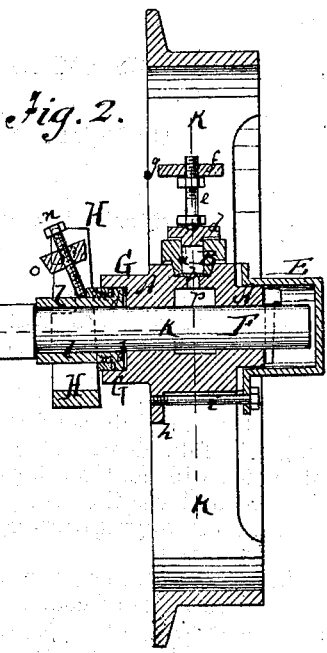
Figure 3:
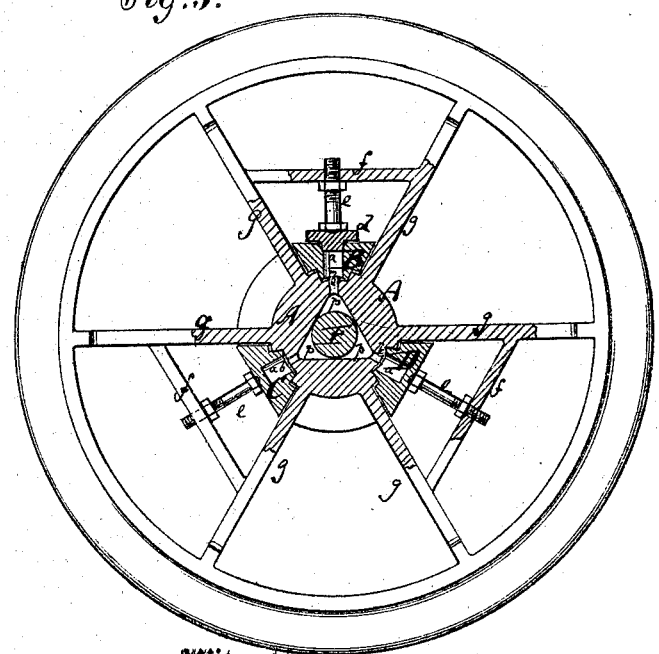
Figure 4:
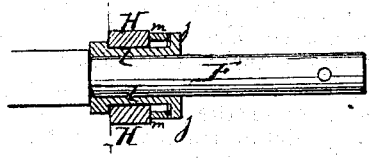
Figure 5:
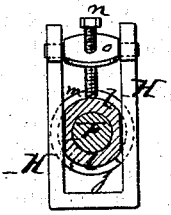

In the accompanying drawing, Figure 1 represents a face view of my improved wheel. Fig. 2 is a vertical central section of the same taken on the line $c\ c$, Fig. 1. Fig. 3 is a vertical section of the same on the line $k\ k$, Fig. 2. Fig. 4 is a detail horizontal section of the hub-closing device taken on the plane of the line $c\ k$, Fig. 2. Fig. 5 is a detail transverse section of the same on the line $q\ q$, Fig. 5.

Similar letters of reference indicate corresponding parts.

A in the drawing represents the wheel-hub, provided with three oil-cups, B, C, and D, which are disposed around the hub at equal distances apart. Each oil-cup consists of an oil-vessel, $a$, entering a chamfered hole in the hub with its stem. The stem should be surrounded with a ring of rubber or other packing to prevent leakage. At the lower end of the stem is placed a circular piece, $b$, of brass or tin, which is cemented or soldered into the stem. In this plate are drilled or punched a number of holes, in accordance with the greater or less quantity of oil to be admitted to the axle. Some of the holes may be stopped up when it is desired to reduce the admission of oil. The oil-cup is closed by a plug or cover, $d$, which is, by a screw, $e$, forced down upon its seat. The screw works in a brace, F, that connects two spokes, $g\ g$, of the wheels, as shown. Suitable packing is applied to the plug $d$ to make it close the cup oil-tight. Oil is poured into one of the three cups, and as it drops down from the same to the axle will flow into the other cups, which, whenever they are on top, will discharge it again upon the axle and let it fall back into the first for redistribution. In this manner a continuous system of lubrication is obtained and no oil wasted, as all that flows down is immediately caught in a cup and poured out again. The cover $d$ may only be applied to the one cup B, into which the oil is poured. The other cups C and D may be altogether closed on top, the screws $e$ serving only to hold them in place. E is a metal cap, secured to one face of the hub to inclose the end of the axle F, as is clearly shown in Fig. 2. It is fastened to a flange, $h$, of the hub by means of bolts $i\ i$. Leather or other packing is interposed between the hub and cap E to prevent leakage. The cap prevents sand, dust, and dirt from entering the outer end of the hub. G is a tubular extension at the other end of the hub. It is larger in external diameter than the axle F, so as to admit the collar-ring $j$. This latter is formed on a sleeve, $l$, which is fitted upon the axle, as shown, and secured either by bolt or rivet. H is a wedge-shaped clevis, larger at the lower end, and fitted over the sleeve $l$ so as to straddle the same, as in Fig. 5. This clevis fits into a grooved or notched portion of the sleeve, and serves to crowd a lead ring, $m$, against the collar $j$. Packing interposed between the rings $j$ and $m$ will be crowded against the inner side of the hub-extension G when the clevis is drawn properly up. The clevis can be raised by means of a screw, $n$, which works in a pivoted crosspiece, $o$, of the clevis and bears against the lead ring $m$, as shown. The lead ring is sloped on the back in conformity to the inclination of the wedge, so that the latter will bear square against it, properly acting on the packing and collar. The clevis serves thus indirectly to properly close the back of the hub, and can be set up to readjust the packing in case of wear.

The oil-chamber $p$ within the hub may be triangular, as in Fig. 3, or of other suitable form. In place of the single plate $b$ in each oil-cup there may be two, one above the other, so that the space between the plates may separate the falling drops from the body of the oil.

The clevis was described as being larger at the lower end and worked up by the screw. It is, however, evident that it may be set in suitable other position, either vertical, horizontal, or otherwise, as may be most convenient for various kinds of vehicles.

Having thus described my invention, what I claim as new, and desire to secure by Letters Patent, is—

1. The three oil-cups, B, C, and D, provided with the oil-vessels $a$, perforated plates or pieces $b$, covers $d$, and screws $e$, applied to the sides of a wheel-hub, A, as shown and described, to operate as specified.

2. The combination of the adjustable wedge-shaped clevis H and screw $n$ with the lead ring $m$ and collar $j$, as and for the purpose specified.

CYRUS SMITH.

Witnesses:
WILLIAM N. THOMPSON,
JEPHTHA V. EMBREE.

(122)